(12) United States Patent
Nguyen et al.

(10) Patent No.: US 8,872,896 B1
(45) Date of Patent: Oct. 28, 2014

(54) HARDWARE-BASED SYSTEM, METHOD, AND COMPUTER PROGRAM PRODUCT FOR SYNCHRONIZING STEREO SIGNALS

(75) Inventors: Dat T. Nguyen, Santa Clara, CA (US); Lauro B. Manalac, San Jose, CA (US); Leslie E. Neft, Mountain View, CA (US); David M. Stears, Santa Clara, CA (US); Jesse S. Clayton, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 2210 days.

(21) Appl. No.: 11/733,062

(22) Filed: Apr. 9, 2007

(51) Int. Cl.
*H04N 13/02* (2006.01)
*H04N 13/00* (2006.01)
*H04N 13/04* (2006.01)

(52) U.S. Cl.
CPC .......... *H04N 13/0003* (2013.01); *H04N 13/044* (2013.01)
USPC ............................................................ 348/46

(58) Field of Classification Search
USPC ...................................................... 348/46, 52
See application file for complete search history.

(56) References Cited

U.S. PATENT DOCUMENTS

| | | | | | |
|---|---|---|---|---|---|
| 5,790,184 | A | * | 8/1998 | Sato et al. ....................... | 348/53 |
| 5,963,200 | A | * | 10/1999 | Deering et al. ............... | 345/213 |
| 6,122,000 | A | * | 9/2000 | Yee et al. ........................ | 348/51 |
| 2007/0085903 | A1 | * | 4/2007 | Zhang ............................. | 348/58 |

OTHER PUBLICATIONS

Liao et al. The Design and Application of High-Resolution 3D Stereoscopic Graphics and Display on PC. WSCG 2000. pp. 1-7.*

* cited by examiner

*Primary Examiner* — John MacIlwinen
(74) *Attorney, Agent, or Firm* — Zilka-Kotab, PC (57) ABSTRACT

A system, method, and computer program product are provided for synchronizing stereo signals. In use, stereo signals are synchronized amongst a plurality of display devices utilizing hardware.

20 Claims, 7 Drawing Sheets

HARDWARE-BASED SYSTEM, METHOD, AND COMPUTER PROGRAM PRODUCT FOR SYNCHRONIZING STEREO SIGNALS

FIELD OF THE INVENTION

The present invention relates to display devices, and more particularly to displaying stereo content using multiple display devices.

BACKGROUND

Sometimes it is desired to display visual data utilizing a plurality of display devices. For example, the display devices may be arranged contiguously, such that different portions of a single image may be appropriately displayed on corresponding display devices. In order to accomplish this in a synchronous manner, frame locking and flip locking techniques have typically been utilized.

Frame locking has generally been utilized for synchronizing a scanout of the display devices. For example, frame locking synchronizes the occurrence of blanking and visible regions associated with the visual data. Additionally, flip locking has ordinarily been utilized for synchronized swapping of front and back buffers, which contain rendered data to be output across such display devices.

Still yet, it is sometimes desired to stereoscopically display the visual data across the display devices, which traditionally requires each display to alternate the display of visual data for a left eye and a right eye. In the past, synchronization of stereo signals across such display devices has conventionally been accomplished utilizing software which has various limitations.

There is thus a need for addressing these and/or other issues associated with the prior art.

SUMMARY

A system, method, and computer program product are provided for synchronizing stereo signals. In use, stereo signals are synchronized amongst a plurality of display devices utilizing hardware.

DETAILED DESCRIPTION

Figure 1:
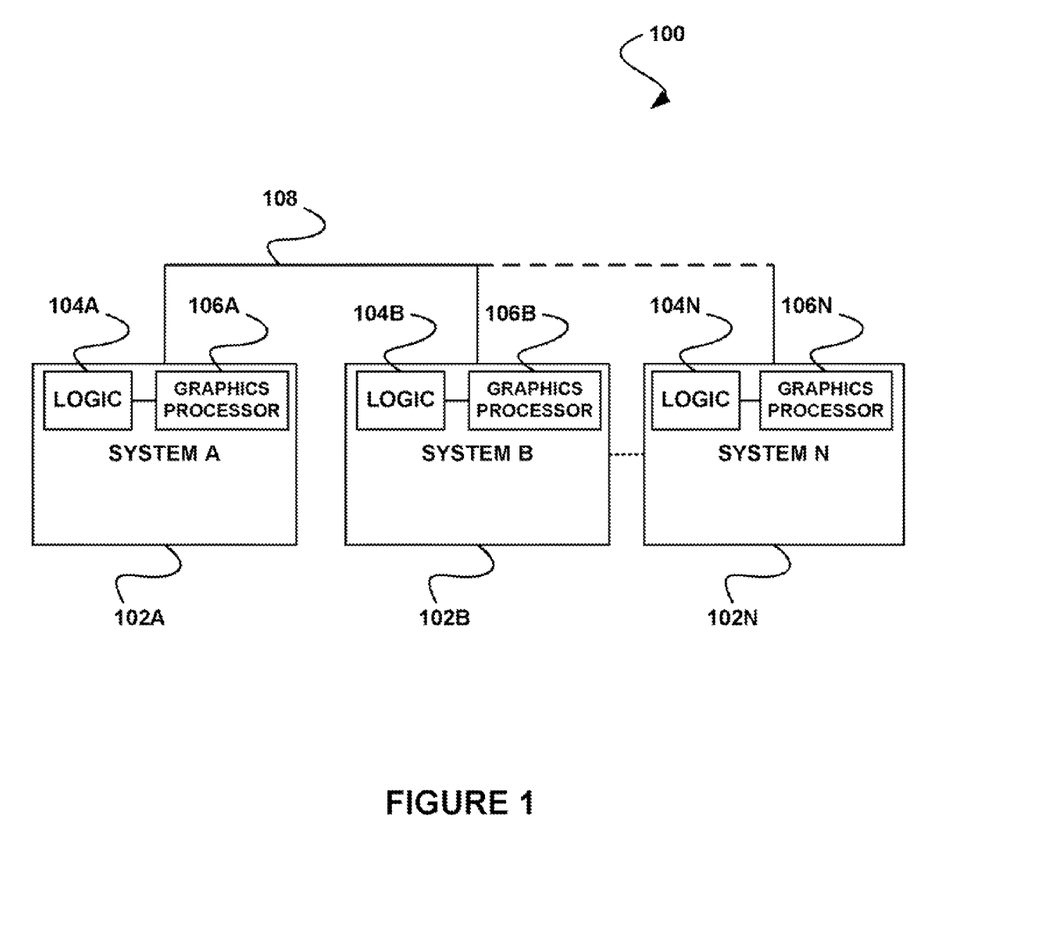
FIG. 1 shows a system for synchronizing stereo signals across a plurality of display devices, in accordance with one embodiment.

FIG. 1 shows a system 100 for synchronizing stereo signals across a plurality of display devices utilizing hardware, in accordance with one embodiment. As shown, a plurality of systems 102A-N is in communication via a bus 108. The systems 102A-N may include any systems associated with display devices.

Further, such display devices may include any devices capable of displaying visual data (e.g. image/video or portions thereof, etc.). For example, the display devices may each include a computer monitor, television, and/or a screen of any other type of system (examples of which will be provided during the description of FIG. 6). To this end, the systems 102A-N may include computers associated with computer monitors, any other type of systems associated with corresponding screens, etc.

Additionally, the bus 108 may include any hardware capable of allowing any of the systems 102A-N to communicate with another one of the systems 102A-N. For example, in one embodiment, the bus 108 may include a frame lock bus. In another embodiment, such frame lock bus may allow any of the systems 102A-N to communicate corresponding states to the other systems 102A-N, the reasons for which will become apparent later.

Still yet, each of the systems 102A-N includes logic 104A-N, as shown. In the context of the present embodiment, the logic 104A-N includes hardware logic capable of synchronizing stereo signals across display devices associated with the systems 102A-N. In various optional embodiments, the logic 104A-N may be utilized for coupling each associated system 102A-N to the bus 108. In addition, the logic 104A-N may allow signals to be transmitted between graphics processors 106A-N [e.g. graphics processing units (GPUs), etc.] associated with the systems 102A-N.

As shown, the logic 104A-N may be separate from the graphics processors 106A-N associated with the systems 102A-N. Of course, however, in another embodiment, the logic 104A-N may be integrated with the graphics processor 106A-N. In use, the graphics processor 106A-N may be utilized for rendering visual data to be displayed, for example.

Further, it should be noted that, while separate systems 102A-N and associated logic 104A-N, graphics processors 106A-N, etc. are shown in FIG. 1, other embodiments are contemplated with such systems 102A-N (or components thereof) integrated in any desired manner. Just by way of example, a single system may be used to drive a plurality of display devices using associated stereo signals, etc. In additional embodiments, the separate systems 102A-N may represent the display devices themselves.

In the context of the present description, the stereo signals that are synchronized may include any desired type of signal (e.g. digital, analog, etc.) capable of controlling, at least in part, the stereoscopic display of visual data. For example, in one optional embodiment, a first portion of visual data may be designated for viewing by a left eye and a second portion of visual data may be designated for viewing by a right eye. Further, such portions of visual data may each include a frame, etc. of visual data.

During use of the foregoing exemplary embodiment, each stereo signal may be utilized for controlling the communication of the appropriate portion of visual data to a corresponding display device. Accordingly, the stereo signals may optionally be utilized for displaying images, etc. that appear to be three dimensional via the display devices and associated visualization devices, such as stereo goggles.

In one embodiment, the logic 104A-N may further include a frame lock capability. The frame lock capability may be utilized for synchronizing a scanout of the display devices. For example, the blanking regions and the visible regions of the display devices may be synchronized to occur at the same time. As an option, one system associated with a display device may be utilized as a master for other slave systems associated with the other display devices. More specifically, the generation of vertical retrace signals for the slave systems may optionally be based on the generation of vertical retrace signals in association with the master system. Of course, it should be noted that the frame lock capability may be implemented in any desired manner.

In another embodiment, the logic 104A-N may further include a flip lock capability. The flip lock capability may be utilized to synchronize the swapping of front and back buffers associated with each of the systems 102A-N. Such front and back buffers may store rendered visual data prior to such visual data being displayed via an associated display device. In addition, left front and back buffers may be utilized as well as right front and back buffers, such that a front and back buffer may be provided for storing rendered visual data associated with each eye.

In one embodiment, the flip lock capability may be implemented utilizing signals transmitted across the bus 108 via the logic 104A-N. For example, such signals may indicate to the graphics processors 106A-N when front and back buffers associated with each system 102A-N are ready to be swapped, as will be described in more detail below. Of course however, the flip lock capability may be implemented in any desired manner (e.g. one example of which will be described in more detail with respect to FIG. 2).

In yet another optional embodiment, the logic 104A-N may include a stereo lock capability. The stereo lock capability may be utilized for synchronizing the stereo signals used to control the display of eye-specific visual data across multiple displays associated with the systems 102A-N. For example, the stereo lock capability may ensure that stereo signals start on the same frame for each of the display devices.

As option, the stereo signals may be synchronized utilizing a state of the stereo signals. For example, such stereo signal state may indicate the particular eye with which content is associated. In one embodiment, the stereo signal state may include a low state (e.g. "0") to indicate visual data associated with a left eye and a high state (e.g. "1") to indicate visual data associated with a right eye. In use, such stereo signal states may be communicated by the logic 104A-N to each of the graphics processors 106A-N via the bus 108.

Moreover, during operation, if the stereo signal state associated with any system 102A-N includes a low state, the graphics processors 106A-N of the systems 102A-N may be prevented from swapping corresponding front and back buffer pairs (e.g. right front buffer, left front buffer, right back buffer and left back buffer). However, if the stereo signal state associated with all of the systems 102A-N includes a high state, the graphics processors 106A-N of the systems 102A-N may be allowed to swap such front and back buffers. To this end, the swapping of front and back buffers, and the display of visual data associated therewith, may be synchronized based on a state of such stereo signals. As an option, the swapping of the front and back buffers may be conditioned on a flip lock signal, as described below. To this end, by controlling the swapping of front and back buffer pairs as described above, a selection of which buffer to display first (i.e. left or right) may also be controlled. In one embodiment, in response to swapping front and back buffer pairs, the left buffer may always be displayed first, as an option.

In use, according to another possible embodiment, the stereo signals may be synchronized utilizing a flip lock signal. In particular, the left and right front and back buffers may only be swapped when the left and right front and back buffers associated with all of the systems 102A-N are ready to be swapped. In one embodiment, the flip lock capability may utilize a flip lock signal associated with the left and right front and back buffers, for determining whether such buffers are ready to be swapped. Optionally, the flip lock signal for each system 102A-N may be communicated to the graphics processors 106A-N via the bus 108. In this way, the graphics processor 106A-N may be utilized to swap the left and right front and back buffers based on the appropriate flip lock signal.

Thus, the flip lock capability may be used in conjunction with the frame lock capability and the stereo state detection to ensure that the visual data stereoscopically displayed on the multiple display devices are synchronized.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
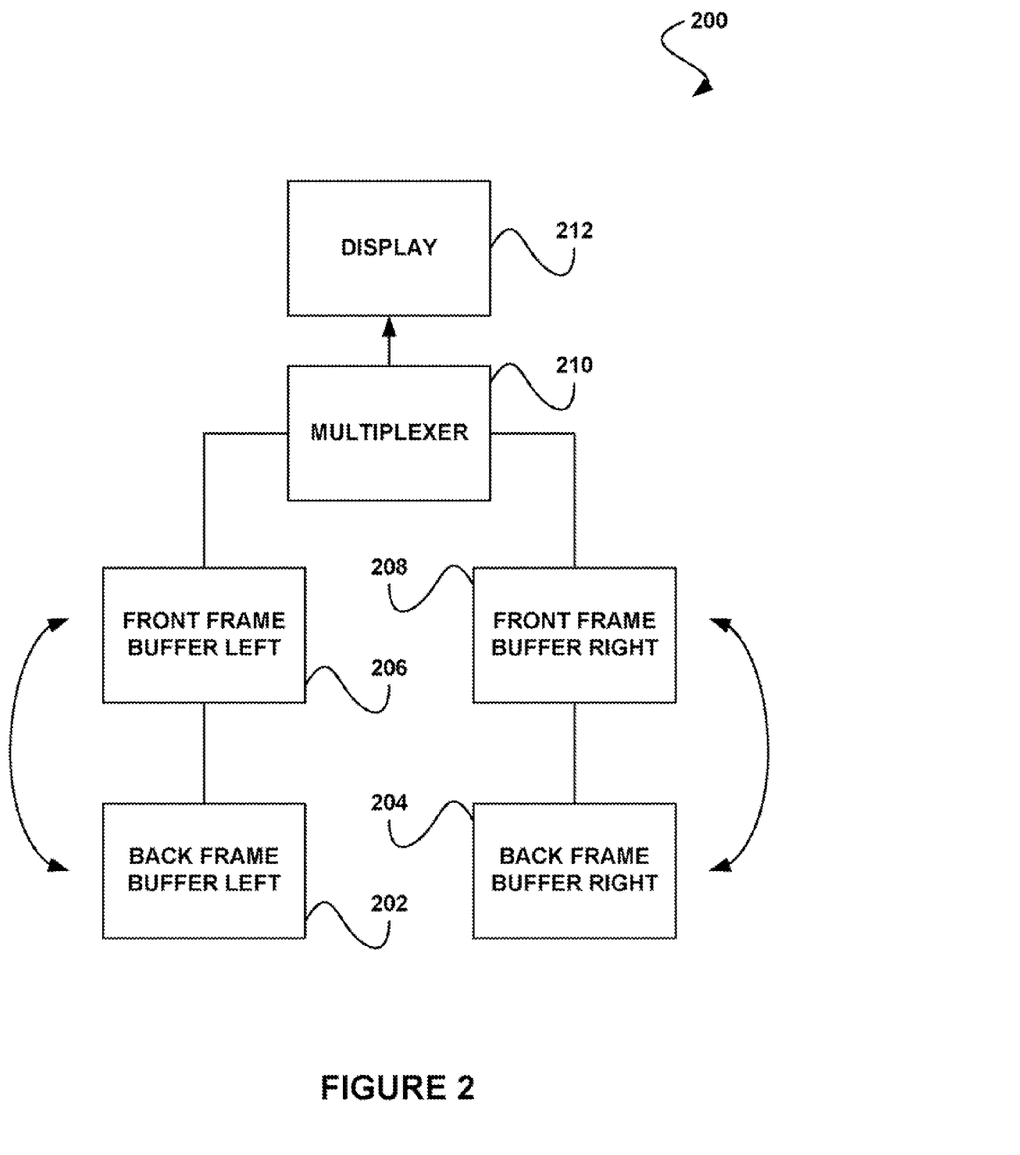
FIG. 2 shows a system for synchronizing front and back frame buffers associated with stereo signals utilizing a flip lock, in accordance with another embodiment.

FIG. 2 shows a system 200 for synchronizing front and back frame buffers associated with stereo signals utilizing a flip lock, in accordance with another embodiment. As an option, the present system 200 may be implemented in the context of each of the systems 102A-N of FIG. 1. Of course, however, the system 200 may be implemented in any desired environment. It should also be noted that the aforementioned definitions may apply during the present description.

As shown, the system 200 includes a left front buffer 206 and a left back buffer 202. In addition, the system 200 includes a right front buffer 208 and a right back buffer 204. The left front buffer 206 and left back buffer 202 may be utilized for storing rendered visual data associated visual data for viewing by a left eye, whereas the right front buffer 208 and the right back buffer 208 may be utilized for storing rendered visual data associated with visual data for viewing by a right eye.

In one embodiment, the left front frame buffer 206 and the right front frame buffer 208 may be first frame buffers, as shown. For example, visual data stored in the left front frame buffer 206 and the right front frame buffer 208 may be fully rendered. In addition, such visual data may be transmitted to the display device 212 via the multiplexer 210 for display thereof.

Such multiplexer 210 may include any device capable of multiplexing the visual data associated with the left front frame buffer 206 and the right front frame buffer 208. Just by way of example, the multiplexer 210 may allow visual data associated with the left front frame buffer 206 to be displayed prior to display of the visual data associated with the right front frame buffer 208, or visa versa. Additionally, such visual data may include a frame, such that a frame associated with a left eye may be displayed prior to display of a frame associated with a right eye, utilizing the multiplexer 210. In one embodiment, such multiplexer 210 may operate under the control of a stereo signal.

Furthermore, the left back frame buffer 202 and the right back frame buffer 204 may include second frame buffers, as shown. For example, visual data stored in the left back frame buffer 202 and the right back frame buffer 204 may not necessarily be fully rendered. Accordingly, the left back frame buffer 202 and the right back frame buffer 204 may each optionally store visual data associated with a frame of visual data, where such frame is in the process of being rendered.

Thus, the left back frame buffer 202 and the right back frame buffer 204 may be utilized for storing visual data during rendering thereof, while the left front frame buffer 206 and the right front frame buffer 208 may be utilized for transmitting rendered visual data to the display device 212. As also shown, the left front frame buffer 206 and the right front frame buffer 208 may each be swapped with the left back frame buffer 202 and the right back frame buffer 204, respectively. In one embodiment, after the visual data stored in the back frame buffers 202 and 204 is fully rendered, the back frame buffers 202 and 204 may be swapped with the front frame buffers 206 and 208.

For example, when the visual data stored in the back frame buffers 202 and 204 is fully rendered, a flip lock signal may be generated that indicates that the back frame buffers 202 and 204 are ready to be swapped with the front frame buffers 206 and 208. For example, the flip lock signal may be pulled low until the back frame buffers 202 and 204 are ready to be swapped with the front frame buffers 206. When the back frame buffers 202 and 204 are ready to be swapped, the flip lock signal may be released to a high state. In one embodiment, the flip lock signal may be released high utilizing pull-up registers associated with a graphics processor of the system 200. Of course, it should be noted that, in various embodiments, the flip lock signal may indicate that swapping may/is to occur, in any desired manner.

To this end, graphics processors that are associated with the system 200 and any other systems displaying associated visual data may determine (e.g. periodically, etc.) whether the flip lock signals associated with all of such systems are in a high state. In one embodiment, such determination may be made based on a single external flip lock signal. In particular, the single external flip lock signal may be based on a logical operation (e.g. AND) performed on all of flip lock signals associated with the abovementioned systems. Accordingly, in one embodiment, the single external flip lock signal may take on a high state only if all of the flip lock signals associated with the systems are in a high state.

In response to such a determination that all of such flip lock signals are in a high state, the graphics processors may be utilized to swap the back frame buffers 202 and 204 with the front frame buffers 206 and 208. Specifically, visual data associated with the back frame buffers 202 and 204 (which, after the swap, serve as front buffers) may be displayed via the display device 212. Further, the front frame buffers 206 and 208 (which, after the swap, serve as back buffers) may be loaded with new visual data (e.g. a next frame, etc.) in the process of being rendered. In response to swapping the back frame buffers 202 and 204 with the front frame buffers 206 and 208, the respective flip lock signals may be pulled to a low again.

In this way, the front frame buffers 206 and 208 and the back frame buffers 202 and 204 may be utilized such that one set is providing rendered stereoscopic visual data to the display device 212 while rendering of visual data within the other set is completed. Thus, the display of visual data via the display device 212 may not necessarily be delayed while such visual data is rendered.

Figure 3A:
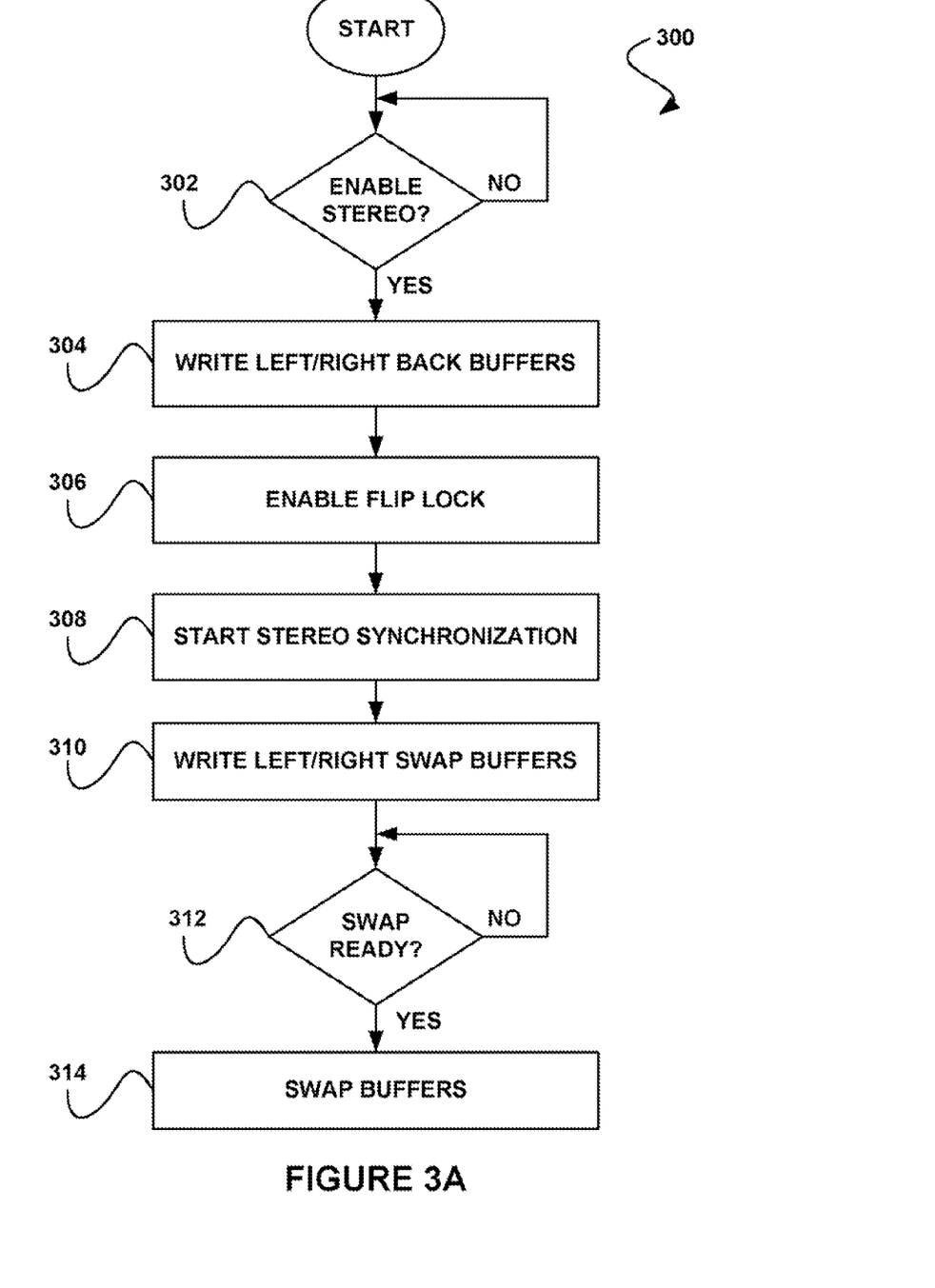
FIG. 3A shows a method for implementing a flip lock for synchronizing frame buffers, in accordance with yet another embodiment.

FIG. 3A shows a method 300 for implementing a flip lock for synchronizing frame buffers, in accordance with yet another embodiment. As an option, the present method 300 may be implemented in the context of the functionality and architecture of FIGS. 1-2. Of course, however, the method 300 may be carried out in any desired environment. It should also, be noted that the aforementioned definitions may apply during the present description.

As shown in decision 302, it is determined whether stereo operation is enabled. In the context of the present embodiment, enabling stereo includes enabling stereo signals for stereoscopically providing visual data to a display device. For example, one portion of the visual data may be for a left eye and another portion of the visual data may be for a right eye.

Additionally, it may be determined whether stereo is enabled within an associated system (System A) with a display device, for carrying out the method 300 of FIG. 3A. System A may include any system that is associated with at least one other system (System B), which are together capable of displaying visual data across multiple displays. In one embodiment, the System B may already have stereo operation enabled. To this end, once it is determined that stereo operation is to be enabled for System A, System A may not necessarily be in sync with System B for which stereo operation has already been enabled. For example, System A may attempt to begin stereo operation by displaying a left buffer, while System B, which has already begun stereo operation, may be displaying a right buffer. The potential for this unsynchronized state requires stereo synchronization of the systems, as described below.

If it is determined that stereo operation is enabled, rendered visual data is written to left and right back buffers of System A, as shown in operation 304. For example, the left back buffer may include a frame of the visual data designated for viewing by a left eye, whereas the right back buffer may include a frame of the visual data designated for viewing by a right eye. In one embodiment, the visual data associated with the left and right back buffers may be rendered utilizing a graphics processor of System A, but of course may also be rendered in any desired manner.

Furthermore, a flip lock associated with System A is enabled. Note operation 306. In one embodiment, the flip lock may be enabled for synchronizing the swapping of front and back buffers associated with System A and System B. In another embodiment, enabling the flip lock may include pulling a flip lock signal associated with System A to a low state.

As a result, System A and System B may be prevented from swapping associated front and back buffers while the flip lock signal is low. Graphics processors associated with System A and System B may periodically determine whether each respective system exhibits a high flip lock signal. Once System A completes rendering visual data for the left and right back buffers, System A may release the flip lock signal to move to a high state. In response to releasing the flip lock signal by System A, a call may be made via a driver to swap corresponding front and back buffers.

Since the call to swap front and back buffers is the first call for System A, visual data from the left buffer of System A may be the first to be presented to an associated display device for display purposes. However, visual data being displayed via System B may not necessarily include visual data from a respective left buffer. Thus, as shown in operation 308, stereo synchronization is started in order to synchronize the display of left and right buffers for System A and System B.

The stereo synchronization may be started based on the call to swap buffers. In this way, the stereo synchronization may be started prior to actually swapping the buffers, such that a graphics processor associated with each of the systems is temporarily prevented from swapping the buffers. Next, appropriate rendered visual data is written to left and right swap buffers of System A (see operation 310).

It is further determined whether System A and System B are both ready to swap buffers, as shown in decision 312. One example for determining whether multiple systems are ready to swap buffers is shown in the method 350 of FIG. 3B, as described herein. Such determination may be made utilizing an external stereo sync signal (see decision 352 of FIG. 3B). The flip lock signal may be pulled low when a state of a stereo signal of System B is in a low state (e.g. which indicates that a left buffer of System B is being displayed via an associated display device). Note operation 354 of FIG. 3B. In use, the low status of the flip lock signal may prevent System A and System B from swapping respective front and back buffers. Further, the flip lock signal may be released to a high state only when a state of a stereo signal from System B is high (e.g. indicating that a right buffer of System B is being displayed). Note decision 356 and operation 358 of FIG. 3B.

Figure 3B:
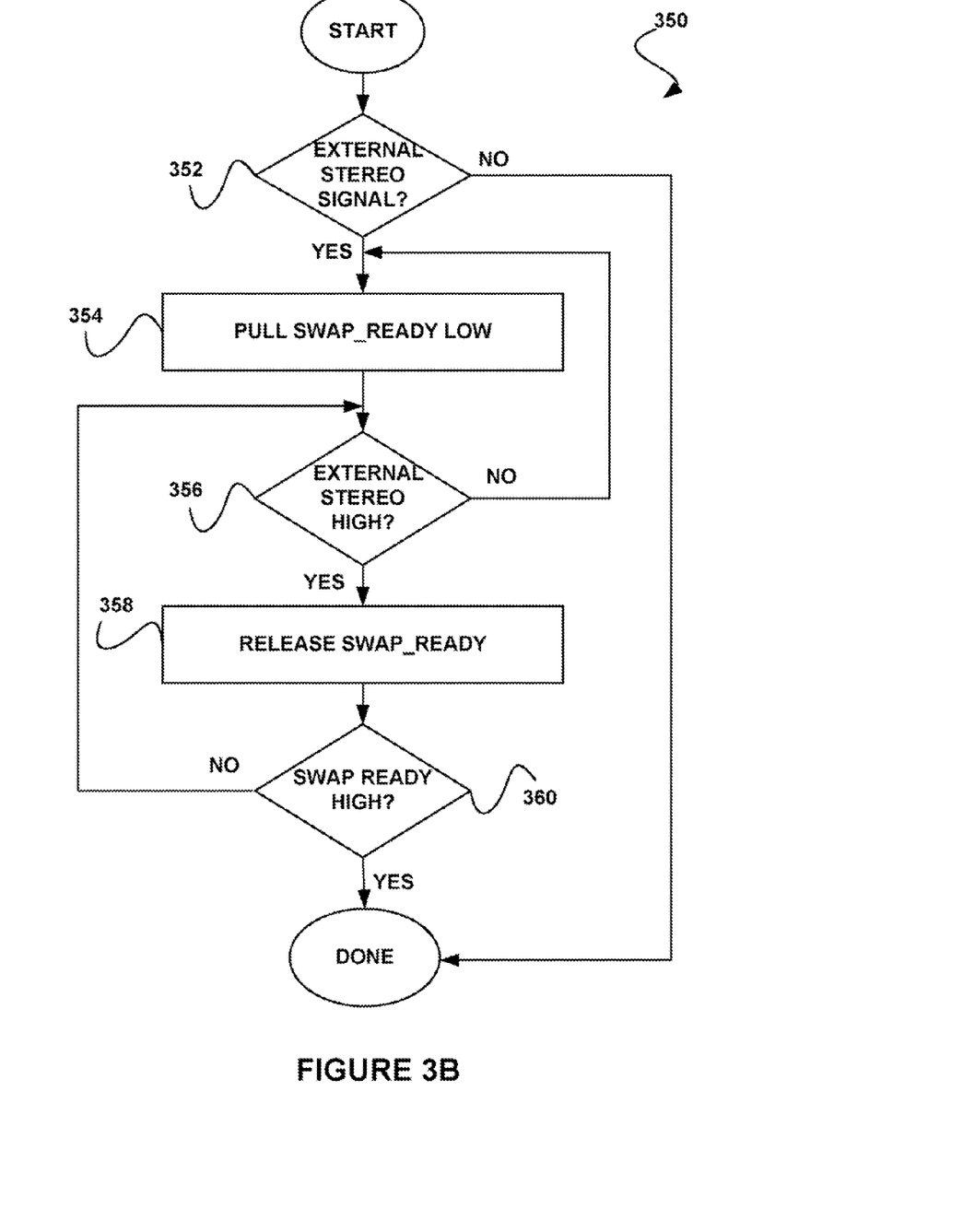
FIG. 3B shows a method for determining whether multiple systems are ready to swap buffers, in accordance with another embodiment.

In response to a determination by System A and System B that the flip lock signal is high (see decision 360 of FIG. 3B), System A and System B are allowed to swap corresponding front and back buffers, as shown in operation 314 of FIG. 3B. In one embodiment, System A may display an associated left front buffer first. Furthermore, since the buffer swap of System A has been stalled until System B is also ready to display its associated left front buffer, the synchronized buffer swap may allow System B to display an associated left front buffer at the same time as System A. In this way, stereo signals may be synchronized across System A and System B utilizing hardware of such systems.

Figure 4:
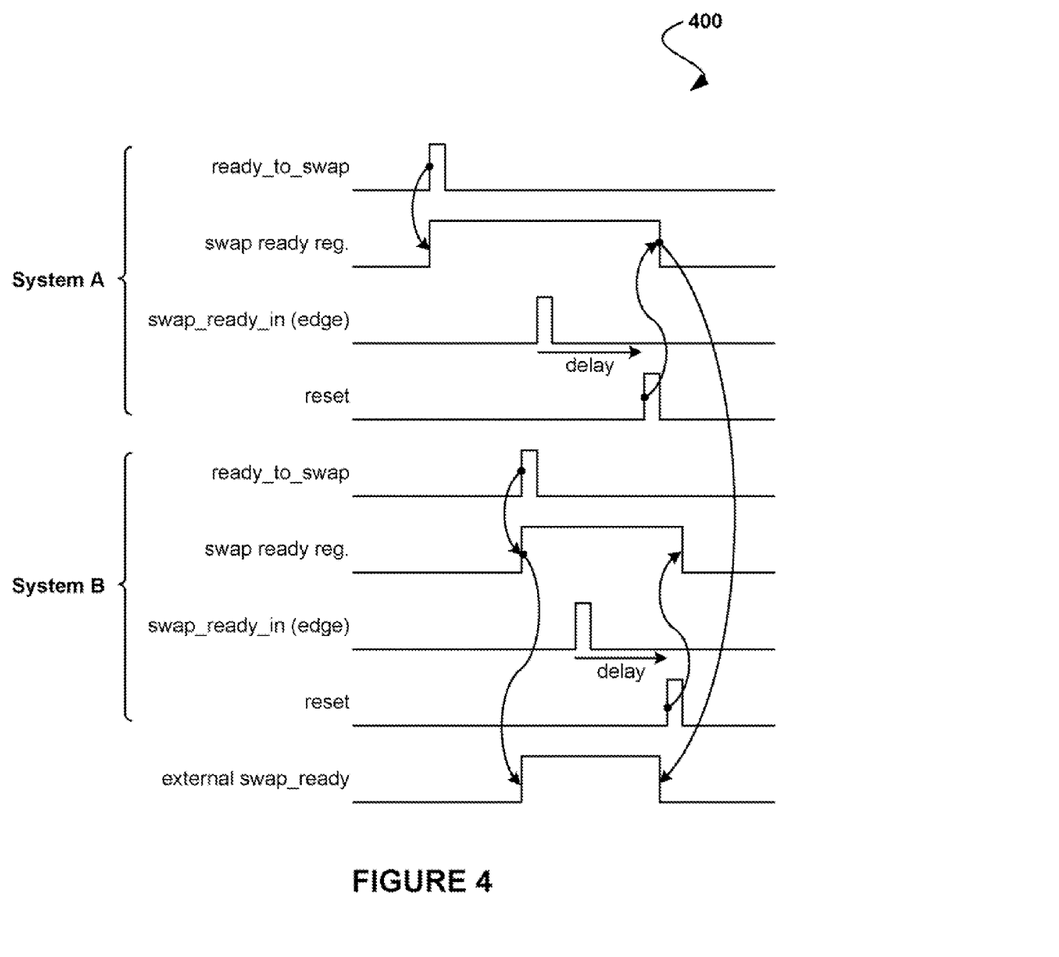
FIG. 4 shows a timing diagram for implementing a flip lock across a plurality of display devices, in accordance with another embodiment.

FIG. 4 shows a timing diagram 400 for implementing a flip lock across a plurality of display devices, in accordance with another embodiment. As an option, the timing diagram 400 may be associated with the context of the functionality and architecture of FIGS. 1-3. Of course, however, the timing diagram 400 may be associated with any desired environment. It should also be noted that the aforementioned definitions may apply during the present description.

As shown, signals associated with two systems (System A and System B) are synchronized. Each system is associated with a ready_to_swap signal, which indicates when back buffers associated with the respective systems have been completely written with rendered visual data. The ready_to_swap signal remains low until the back buffers are written.

Once the back buffers have been written, the ready_to_swap signal goes high, indicating that the back buffers have been written and are ready to be swapped with front buffers of the associated system. The swap_ready_register further takes on a high state in response to the high state of the ready_to_swap signal.

In response to the swap_ready_registers associated with both systems being high, the external swap_ready signal takes on a high state. The external swap_ready signal indicates to graphics processors associated with the systems being synchronized that the front and back buffers associated therewith are ready to be swapped. Accordingly, the graphics processors may swap the front and back buffers in response to the external swap_ready signal being high.

Further, a swap_ready_in signal goes high once the external swap_ready signal goes high. The swap_ready_in signal also initiates a delay. As shown, the delay includes a time period (e.g. predefined, programmable, etc.) which is exhausted prior to a reset swap_ready_register signal going high. In one embodiment, the delay may be less than a time period utilized in displaying a frame associated with the front and back buffers.

The reset swap_ready_register signal indicates that the swap_ready_registers are changed to a low state, as shown. Once the swap_ready_registers go low, the front and back buffers may be prevented from being swapped by the graphics processors. In this way, the delay may provide a particular time period for allowing graphics processors to identify a high signal state of the external swap_ready signal, and to accordingly swap back and front buffers associated therewith.

In the specific embodiment shown, which is set forth by way of example only, a ready_to_swap signal associated with System A goes high, thus indicating that back buffers associated with System A are written. In response, a swap_ready_register signal associated with System A is held high. The external swap_ready signal is nevertheless held low since the swap_ready signal associated with System B is pulled low, indicating that the back buffers associated with System 13 are not yet written. In particular, the external swap_ready signal may only go high in response to the back buffers associated with both System A and System B being written (e.g. identified by performing a NAND operation with respect to the swap_ready_register signals of the systems, etc.).

Thus, as also shown, once the ready_to_swap signal associated with System B goes high, indicating that back buffers associated with System B are written, a swap_ready_register signal associated with System B also goes high. The external swap_ready signal then goes high, such that graphics processors of System A and System B may be allowed to swap associated back and front buffers. Furthermore, a swap_ready_in signal is released with respect to System A and System B, which initiates a delay. Upon completion of the delay, the reset swap_ready_register signal goes high, thus pulling the signals associated with the swap_ready_registers of System A and System B low. To this end, the swapping of front and back buffers associated with System A and System B are synchronized.

Figure 5:
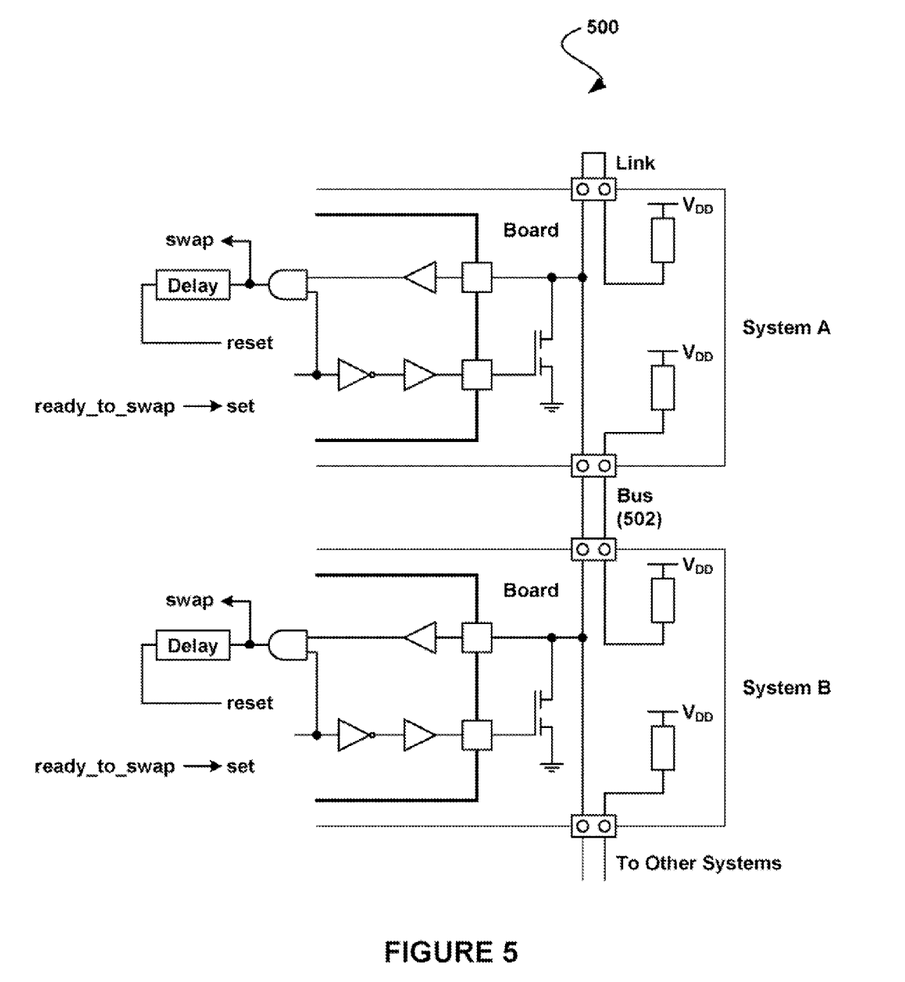
FIG. 5 shows a logical circuit for implementing a flip lock across a plurality of display devices, in accordance with yet another embodiment.

FIG. 5 shows a logical circuit 500 for implementing a flip lock across a plurality of display devices, in accordance with yet another embodiment. As an option, the logical circuit 500 may be implemented the context of the functionality and architecture of FIGS. 1-4. For example, the logical circuit 500 may be used for carrying out the timing shown in FIG. 4. Further, it should be noted that the logical circuit 500 may be implemented in the context of a field programmable gate array (FPGA) or any other circuitry, for that matter. Of course, however, the logical circuit 500 may be implemented in any desired environment. It should also be noted that the aforementioned definitions may apply during the present description.

As shown, the logical circuit 500 transmits signals within each system (System A and System B), and also transmits signals between such systems. To this end, the systems may optionally be in communication via a bus 502, for example. Each system is capable of setting a ready_to_swap signal. The ready_to_swap signal may be set to a low signal (e.g. "0"), indicating that back buffers of the associated system are still in the process of being written, and are therefore not ready to swap.

Once the back buffers of a system are written, the ready_to_swap signal goes high. Further, in response to the ready_to_swap signals associated with both systems going high, an external swap_ready signal goes high (e.g. based on a AND operation performed on the ready_to_swap signals of the systems, etc.). The external swap_ready signal is that which resides on the bus 502 and allows the systems to swap the front and back buffers of the associated systems.

In response to the external swap_ready signal associated with each of the systems, a delay signal is initiated, in the manner shown. The delay signal prevents the ready_to_swap signal from being reset. In response to a completion of the delay associated with each of the systems, the ready_to_swap signal is reset for the respective systems, thus pulling the external swap_ready signal low. To this end, the logical circuit 500 may be utilized for synchronizing the swapping of front and back buffers of multiple systems.

Figure 6:
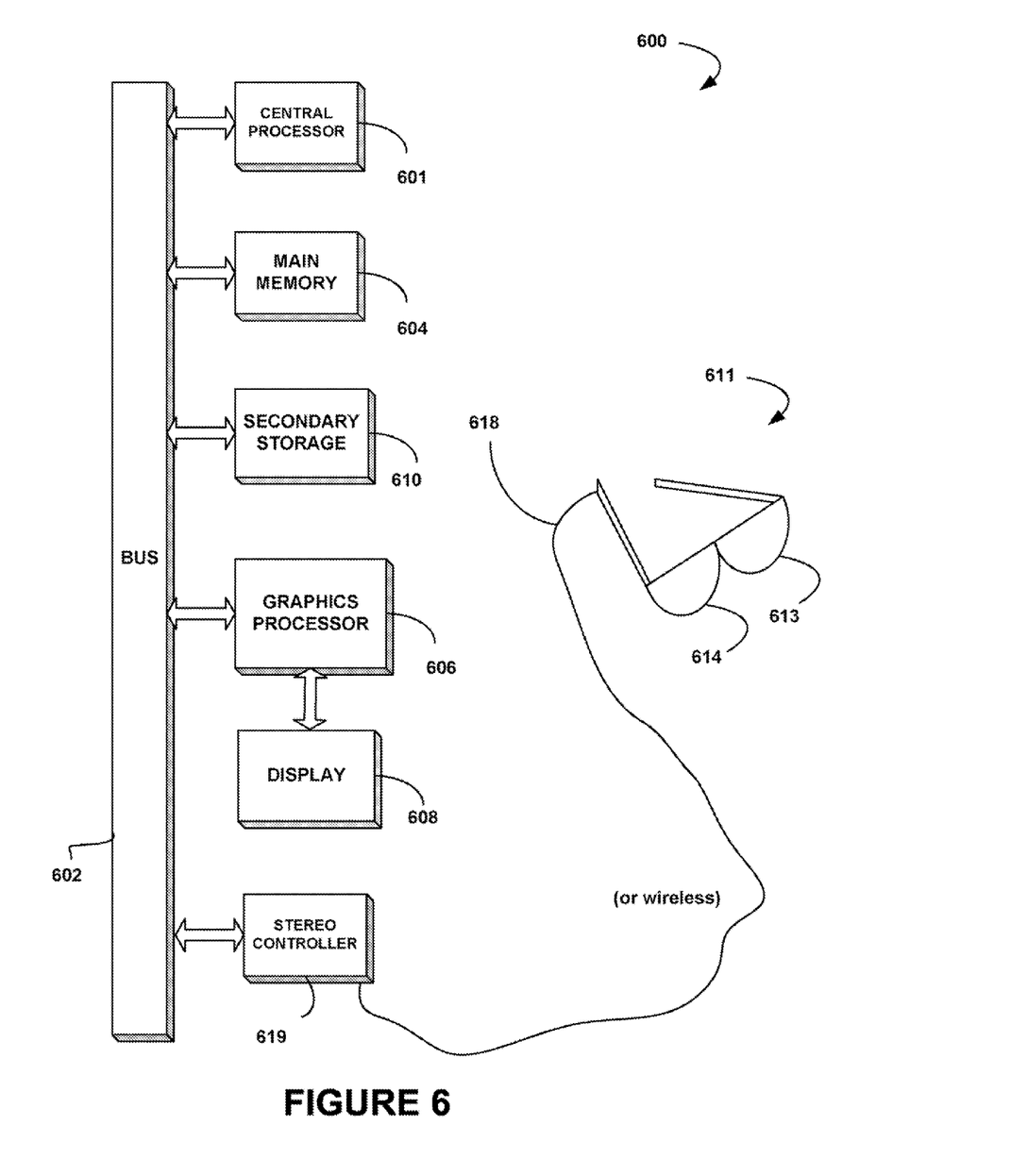
FIG. 6 illustrates an exemplary system in which the various architecture and/or functionality of the various previous embodiments may be implemented.

FIG. 6 illustrates an exemplary system 600 in which the various architecture and/or functionality of different embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608 in the form of any of the displays mentioned hereinabove. While one system 600 and display 608 are shown in FIG. 6, additional displays may be provided in the context of the present system 600 or other systems, as desired, for carrying out the functionality set forth hereinabove.

In one embodiment, the graphics processor 606 may include a plurality of shader modules, a rasterization module, etc. Each of the foregoing modules may even be situated on a single semiconductor platform to form a graphics processing unit (GPU). In the present description, a single semiconductor platform may refer to a sole unitary semiconductor-based integrated circuit or chip. It should be noted that the term single semiconductor platform may also refer to multi-chip modules with increased connectivity. Of course, the various modules may also be situated separately or in various combinations of semiconductor platforms per the desires of the user. For example, an embodiment is contemplated where a single-chip computer or game console includes an integrated central processor, graphics processor, etc.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In various embodiments, the architecture and/or functionality of the various other figures may be implemented in the context of the host processor 601, graphics processor 606, a chipset (i.e. a group of integrated circuits designed to work and sold as a unit for performing related functions, etc.), and/or any other integrated circuit for that matter. Still yet, the architecture and/or functionality of the various figures may be implemented in the context of a general system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

As an option, further included may be a pair of stereo glasses 611 capable of being worn on a face of a user. While the stereo glasses 611 are shown to include two elongated members for supporting the same on the face of the user, it should be noted that other constructions (e.g. member-less design, head strap, helmet, etc.) may be used to provide similar or any other type of support. As further shown, the stereo glasses 611 also include a right eye shutter 614 and a left eye shutter 613.

Both the right eye shutter 614 and left eye shutter 613 are capable of both an open orientation and a closed orientation. In use, the open orientation allows more light therethrough with respect to the closed orientation. Of course, such orientations may be achieved by any desired mechanical, electrical, optical, and/or any other mechanism capable of carrying out the above functionality.

For control purposes, the stereo glasses 611 may be coupled to a stereo controller 619 via a cable 618 (or without the cable 618 in a wireless environment). In various embodiments, the stereo controller 619 may reside in any location associated with the system 600, the stereo glasses 611, and/or even in a separate module, particularly (but not necessarily) in an embodiment where the graphics processor 606 is attached to a separate interface [e.g. universal serial bus (USB), etc.] on the system 600. As shown, in one embodiment, the display 608 may be directly connected to the graphics processor 606, and the stereo controller 619 may further be directly connected to the system 600 via a USB interface or any other interface, for that matter. In other embodiments, the stereo controller 619 may be coupled between the graphics processor 606 and the display 608 for carrying out the desired functionality. Of course, the stereo controller 619 may comprise any hardware and/or software capable of the providing such desired functionality.

Specifically, in some embodiments, the right eye shutter 614 and left eye shutter 613 are controlled to switch between the closed orientation and the open orientation. This may be accomplished in any desired manner. Just by way of example, the graphics processor 606 may provide appropriate left/right control signals to the stereo controller 619 over the bus 602, USB interface, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A subsystem, comprising:
   hardware for synchronizing stereo signals amongst a plurality of display devices, each of the plurality of display devices displaying visual data designated for viewing by both a left eye and a right eye, such that right eye visual data of a first display device of the plurality of display devices is synchronized with right eye visual data of a second display device of the plurality of display devices, and left eye visual data of the first display device is synchronized with left eye visual data of the second display device;
   wherein the subsystem is operable such that a flip lock associated with the first display device and the second display device is enabled in response to a determination that stereo operation is enabled between the first display device and the second display device, and as a result of the flip lock associated with the first display device and the second display device being enabled, a flip lock signal is set to a low state and a back buffer of the first display device is prevented from being displayed while a front buffer of the second display device is being displayed.

2. The subsystem of claim 1, wherein the hardware includes a graphics processor.

3. The subsystem of claim 2, wherein the graphics processor includes a graphics processing unit (GPU).

4. The subsystem of claim 1, wherein the hardware is separate from a graphics processor.

5. The subsystem of claim 1, wherein the stereo signals are synchronized utilizing a state of the stereo signals.

6. The subsystem of claim 5, wherein the state of the stereo signals indicates a particular eye with which visual data being displayed utilizing the display devices is associated.

7. The subsystem of claim 6, wherein a low state of the stereo signals indicates visual data associated with the left eye.

8. The subsystem of claim 6, wherein a high state of the stereo signals indicates visual data associated with the right eye.

9. The subsystem of claim 1, wherein the stereo signals are synchronized utilizing the flip lock signal.

10. The subsystem of claim 1, wherein the stereo signals are communicated between the plurality of display devices utilizing the hardware.

11. The subsystem of claim 1, wherein the hardware is included in the display devices.

12. The subsystem of claim 11, wherein the hardware of the display devices is coupled via a bus.

13. The subsystem of claim 1, wherein the stereo signals control the display of visual data.

14. The subsystem of claim 1, wherein a first stereo signal is associated with the left eye and a second stereo signal is associated with the right eye.

15. The subsystem of claim 1, wherein the visual data includes at least one of images and video.

16. The subsystem of claim 1, wherein the flip lock signal is set to a high state in response to a sync signal from the second display device, and in response to the flip lock signal being set to the high state, the back buffer of the first display device is swapped with a front buffer of the first display device, such that the back buffer of the first display device previously prevented from being displayed is now being displayed by the first display device.

17. The subsystem of claim 16, wherein, in response to the flip lock signal being set to the high state, a call is made via a driver to swap the back buffer of the first display device with the front buffer of the first display device.

18. The subsystem of claim 16, wherein the swap of the back buffer of the first display device with the front buffer of the first display device only occurs when the front buffer of the second display device is ready to be swapped with a back buffer of the second display device as indicated by the flip lock signal in response to the back buffer being completely written with rendered visual data.

19. A method, comprising:
synchronizing stereo signals amongst a plurality of display devices utilizing hardware, each of the plurality of display devices displaying visual data designated for viewing by both a left eye and a right eye, such that right eye visual data of a first display device of the plurality of display devices is synchronized with right eye visual data of a second display device of the plurality of display devices, and left eye visual data of the first display device is synchronized with left eye visual data of the second display device; and
controlling a display of visual data via the plurality of display devices, utilizing the synchronized stereo signals
wherein a flip lock associated with the first display device and the second display device is enabled in response to a determination that stereo operation is enabled between the first display device and the second display device, and as a result of the flip lock associated with the first display device and the second display device being enabled, a flip lock signal is set to a low state and a back buffer of the first display device is prevented from being displayed while a front buffer of the second display device is being displayed.

20. A system, comprising:
a plurality of processors for synchronizing stereo signals amongst a plurality of display devices, each of the processors associated with one of the display devices and each of the plurality of display devices displaying visual data designated for viewing by both a left eye and a right eye, such that right eye visual data of a first display device of the plurality of display devices is synchronized with right eye visual data of a second display device of the plurality of display devices, and left eye visual data of the first display device is synchronized with left eye visual data of the second display device;
wherein the plurality of processors remain in communication with memory and the plurality of display devices via a bus;
wherein the system is operable such that a flip lock associated with the first display device and the second display device is enabled in response to a determination that stereo operation is enabled between the first display device and the second display device, and as a result of the flip lock associated with the first display device and the second display device being enabled, a flip lock signal is set to a low state and a back buffer of the first display device is prevented from being displayed while a front buffer of the second display device is being displayed.

* * * * *